R. HUFF.
CARBURETER.
APPLICATION FILED AUG. 29, 1907. RENEWED DEC. 31, 1913.
1,095,326.
Patented May 5, 1914.
3 SHEETS—SHEET 3.
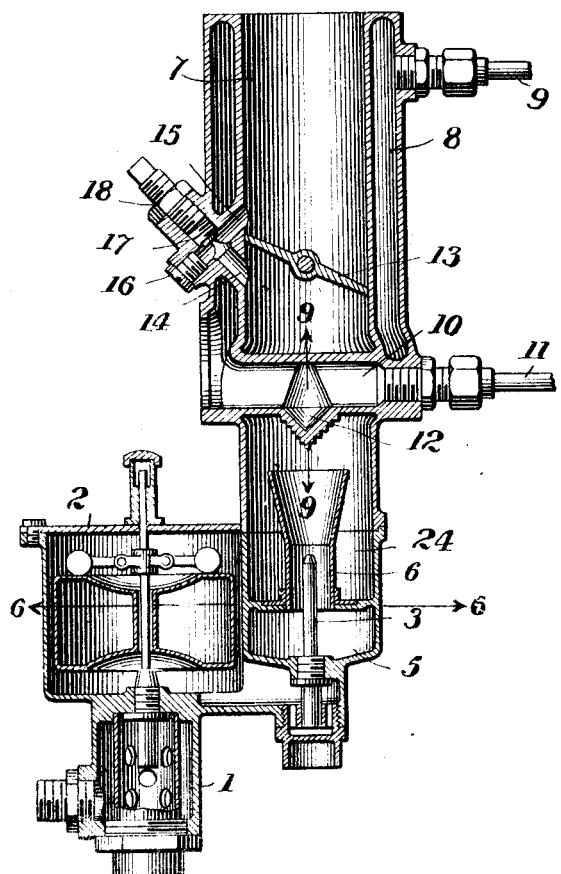
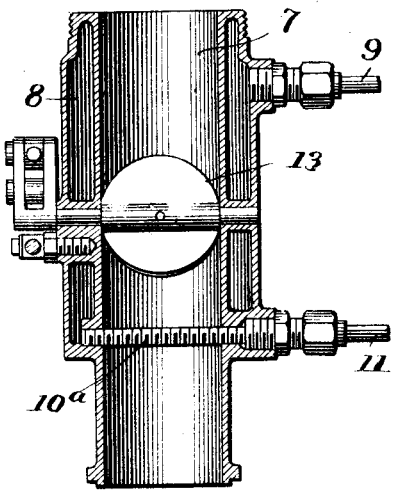
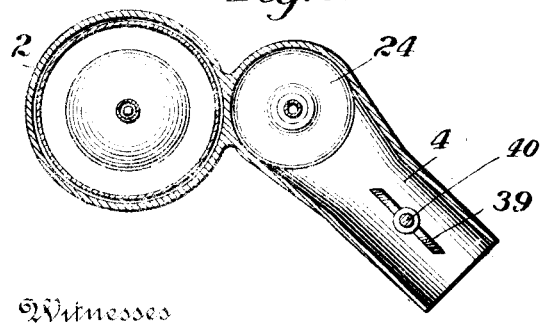
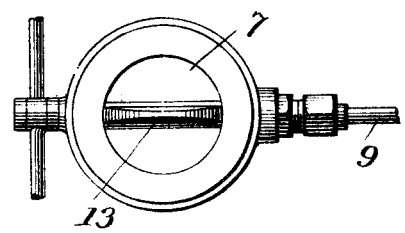
Witnesses
Inventor
Russell Huff
By Foster Freeman Watson &c
Attorneys

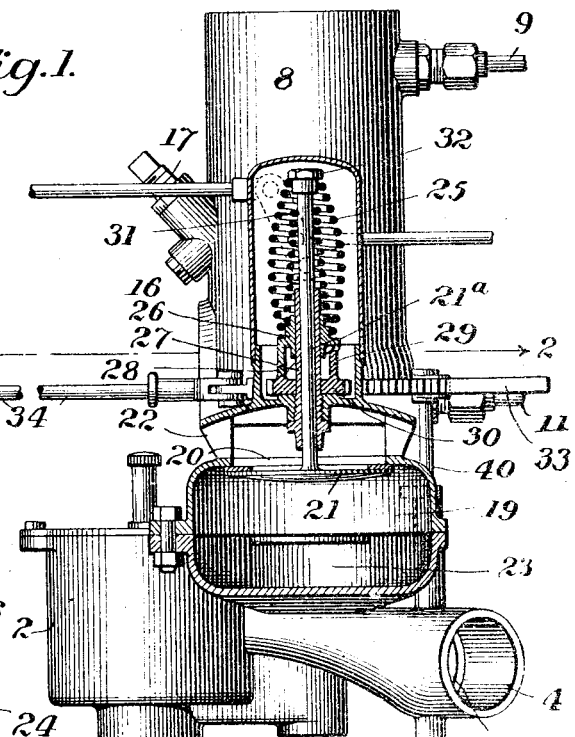
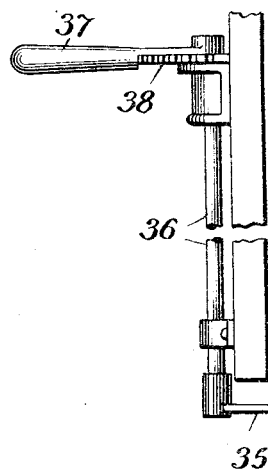
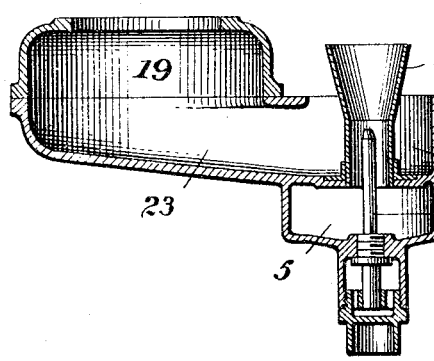
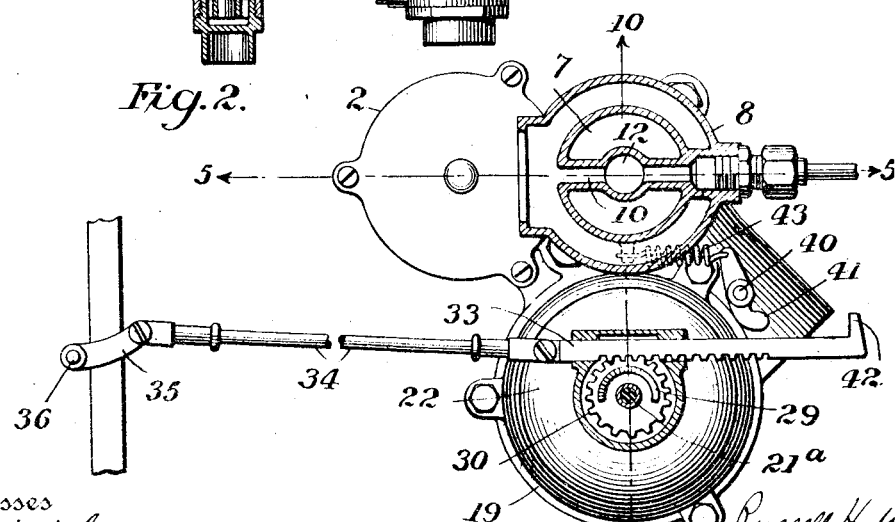

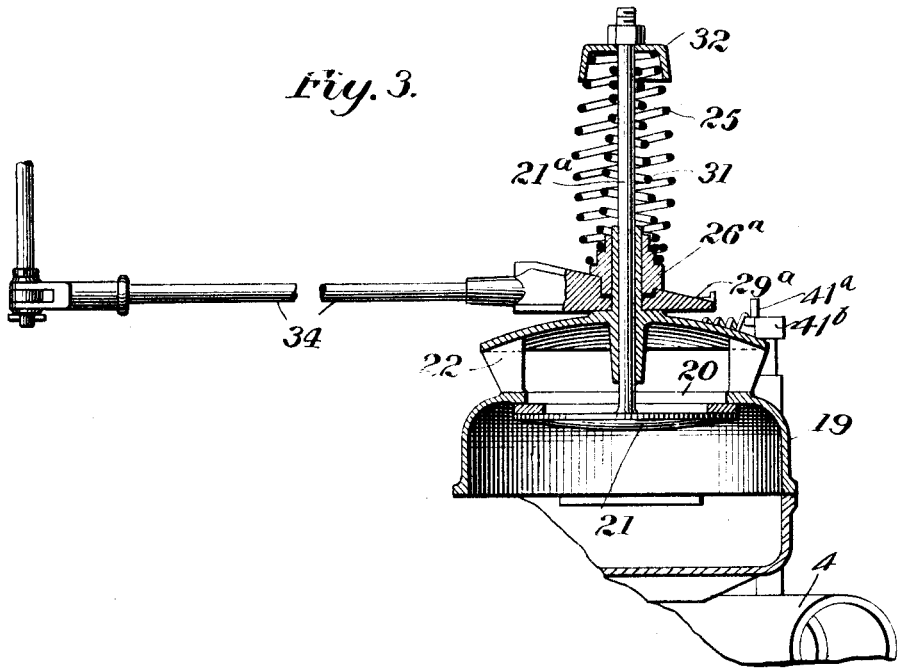
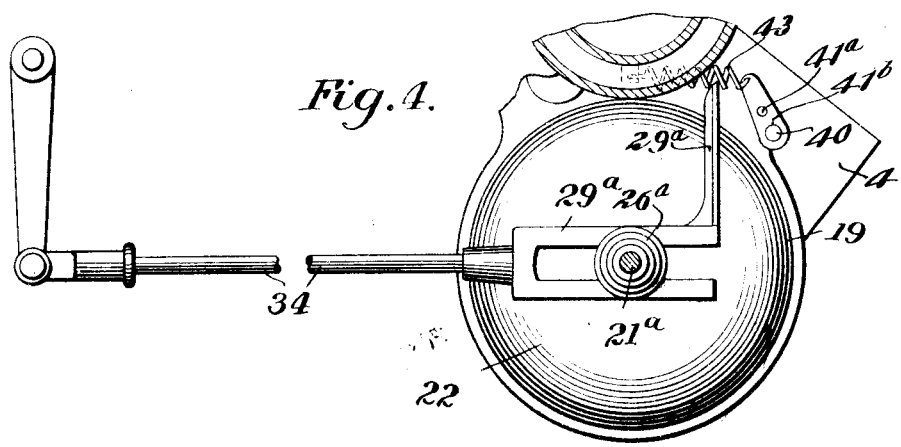

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

CARBURETER.

1,095,326.     Specification of Letters Patent.     Patented May 5, 1914.

Application filed August 29, 1907, Serial No. 390,652. Renewed December 31, 1913. Serial No. 809,761.

*To all whom it may concern:*

Be it known that I, RUSSELL HUFF, a citizen of the United States, residing at Detroit, Wayne county, Michigan, have invented certain new and useful Improvements in Carbureters, of which the following is a specification.

The present invention relates more particularly to carbureters and it consists in various improvements in the construction and working of such devices.

The invention will be described in connection with the accompanying drawing, in which—

Figure 1 is a side elevation, partly in section, of a carbureter embodying the invention; Fig. 2 is a plan view partly in section on the line 2—2 of Fig. 1; Figs. 3 and 4 are, respectively, a sectional elevation and a plan illustrating a modification of a part of the devices shown in Figs. 1 and 2; Fig. 5 is a section on the line 5—5 of Fig. 2; Fig. 6 is a section on the line 6—6 of Fig. 5; Fig. 7 is similar to part of Fig. 5, showing a modification thereof; Fig. 8 is a plan of the parts shown in Fig. 7; Fig. 9 is a section on the line 9—9 of Fig. 5, and Fig. 10 is a section on the line 10—10 of Fig. 2.

Referring to the drawing, 1 indicates the gasolene filter well and 2 the float chamber. These parts are of ordinary construction and need not be described in detail. It will be understood that the gasolene passes from the float chamber directly into the nozzle 3, and that it is drawn from the nozzle periodically by the suction created in the cylinders by the working of the pistons therein.

Referring to Figs. 1, 2 and 5, 4 indicates the primary air intake which is open at its outer end to the atmosphere and communicates at its inner end with a chamber 5 surrounding the gasolene nozzle 3. From the chamber 5, a tube 6, concentric with the nozzle and surrounding the same leads upward into the mixing chamber 7. The upper portion of the tube 6 is flared outwardly preferably above the outlet of the nozzle 3. It will be understood that at each cycle of operations of the engine the gasolene is drawn from the nozzle 3 and a supply of air is drawn through the intake 4 and mixes with the gasolene in the mixing chamber. The mixing chamber 7 is constructed with a water jacket 8 through which hot water is circulated to assist in vaporizing the gasolene or other hydrocarbon. The hot water is preferably taken directly from the water jacket of the engine cylinder and conducted into the water jacket 8 through the inlet 9. After passing through the water jacket the water is conducted diametrically across the mixing chamber in the tube 10 to an outlet 11. As shown in Figs. 5 and 9, the tube 10 is formed with an enlargement 12 having a downwardly depending corrugated surface directly over the gasolene nozzle 3. This provides an enlarged heated surface against which the mixture of gasolene and air is projected, which greatly facilitates the vaporizing of the gasolene and increases the efficiency of the carbureter. The mixture is conducted from the upper end of the mixing chamber through suitable conduits to the cylinder or cylinders of the engine.

Within the mixing chamber is a throttle valve 13 which, as shown in Fig. 5, is adapted to completely close the direct passage through the mixing chamber. It is found desirable to provide a channel or by-pass leading through or around the valve 13 to provide for a minimum charge of mixture which will permit of minimum speed of the engine. In the present instance I provide a by-pass which is accessible from the outside of the mixing chamber and adjustable to vary the minimum supply of mixture.

Referring to Fig. 5, 14, 15 indicate two bores or passages which intersect and which extend entirely through the wall of the mixing chamber and through solid metal extending across the water jacket. One of these tubes is closed at the outside by a plug 16 while the other is closed by an adjustable valve 17, the said valve being adapted to close the by-pass 14, 15, or to leave same open to any desired degree. The valve 17 is provided with a lock nut 18 for holding the valve in any desired adjustment. It will be obvious that the by-pass can be adjusted with ease from the outside and also that it can be readily cleaned by removing the plug 16 and the valve 17.

In Figs. 1 and 2 I have shown means for providing an auxiliary air supply to the mixing chamber, such additional supply being necessary when the engine is running at a high speed, and I have also shown means for regulating this auxiliary air supply.

Referring to these figures, 19 indicates an air chamber which has an opening 20 in its upper side normally closed by a valve 21. The valve is supported by a spider 22 having legs resting on the air chamber 19 and between which the air may enter said chamber when the valve is opened. From the lower part of the chamber 19 a passage or conduit 23 conducts the air to the space 24 surrounding the tube 6 which receives air from the primary air intake 4. The chamber 19 and the passage 23 may be termed a secondary or supplemental air intake.

The valve 21 is normally held in closed position by a spring 25, the upper end of which bears on a head upon the upper end of the stem 21° of the valve, and the lower end of which bears upon a sliding abutment 26 adapted to slide vertically upon a fixed tube 27 in which the valve stem is guided. The abutment 26 is prevented from turning on the tube 27 by suitable means such as a key or spline, and it is provided on its lower face with a wedge or cam, as shown in Fig. 1. This wedge or cam 28 is circular or cylindrical and has an inclined under face which rests on and coöperates with a reversely inclined face of the circular cam or wedge 29 carried by a gear 30. By rotating the gear 30 the abutment 26 may be raised or lowered, thus placing more or less tension on the spring 25 which normally closes the valve 21.

Surrounding the stem of the valve 21 is a second spring 31 which is somewhat shorter and stiffer than the spring 25 and which rests on the abutment 26. This spring is normally relaxed, being out of contact with the head 32 of the valve stem. When the engine is running at low speeds and the suction is comparatively light, the valve 21 will be controlled principally by the spring 25, the spring 31 acting as a buffer or yielding stop for the valve and tending to effect a prompt return of the same to its seat. At higher speeds, however, or when the suction is greater, the spring 31 will coöperate with the spring 25 to automatically control the extent of opening of the valve 21, the extent of which opening should manifestly be greater that when the engine is running at low speeds, although not so great as would be permitted by the spring 25 acting alone. In other words, it may be said within a certain range the valve is controlled almost solely by the lighter spring, while at higher speeds it is controlled by both springs, the effect being that at high speeds the opening is less in proportion to the suction than at low speeds. The tension on the spring 25 and the point in the travel of the valve at which the spring 31 becomes effective, are controlled by the adjustable head 32.

By rotating the gear 30 sufficient tension may be placed on the springs 25 and 31 to prevent the opening of the valve 21 excepting when the vehicle is running at a very high speed and the suction is very great. The gear is controlled by a rack 33, connecting rod 34, arm 35, rock shaft 36 and hand lever 37, the said rock shaft being preferably mounted in bearings on the dash board. A suitable latch or pawl on the hand lever 37 is adapted to lock the lever in any desired adjustment with respect to a notched segment 38.

The primary air intake 4 is provided with a valve 39 by means of which it may be completely closed when desired. The valve 39 is operated by a shaft 40 (Figs. 1, 2 and 6) and upon the upper end of the shaft is an arm 41 in the path of a shoulder 42 upon the rack 33. A spring 43 connected with the second arm of the shaft 40 normally holds the valve 39 open but when the lever 37 is drawn to the limit in one direction to secure the closing of the auxiliary air valve 21, the shoulder 42 engages the arm 41 and rotates the shaft 40, closing the main air valve 39. The object of providing means for closing the main air intake and placing the valve of the auxiliary air intake under heavy pressure is to enrich the charge of mixture passing to the cylinders in stopping the motor. Thus by gradually closing the air valves as the motor comes to a stop, the mixture drawn into the cylinders will gradually increase in richness and if the valves be kept practically closed during the last few strokes of the engine, the cylinders will be provided with a rich mixture which will ignite if the engine has stood inactive for some hours. With this arrangement of the valves, the motor can be started by simply switching on the ignition and not thus obviating the necessity of "cranking."

In Figs. 3 and 4 I have shown a modified form of cam for placing tension on the auxiliary air valve. Referring to these figures, 26ª indicates the abutment for the springs 25 and 31, and 29ª indicates a double wedge having its upper surfaces inclined to coöperate with inclined lower faces of the abutment 26ª. This straight inclined wedge operates exactly as the rotary wedge 29 to adjust the tension of the springs 25 and 31. The spring 25 always bears upon the auxiliary air inlet valve, but ordinarily the spring 31 has no bearing on said valve except to form a cushion or yielding stop for the valve if it is violently opened against the tension of the spring 25. When the wedge is driven in to the limit both springs are compressed against the head 32 on the valve stem and the valve is tightly closed and opens only under very heavy suction due to rapid movement of the motor. This form of the invention may also be arranged to close the primary inlet throttle valve and for this purpose I have shown a laterally extending arm 29ᵇ on one side of the wedge 29ª, this arm being adapted to engage a pin 41ᵃ on the arm 41ᵇ, which actuates the valve 39, when the wedge is moved to a position to give the maximum tension to the springs. Further movement of the wedge after the arm 29ᵇ engages the pin 41ᵃ causes the valve to be swung to closed position and when the wedge is moved in the opposite direction the valve is opened by the spring 43.

In Figs. 7 and 8, the outlet from the water jacket 8 is through a tube 10ᵃ extending diametrically across the mixing chamber directly over the gasolene nozzle. This tube 10ᵃ is preferably threaded to increase its surface and the gasolene is sprayed toward it. The tube thus acts as a baffle to intercept any unvaporized gasolene and hold it in a current of air, and it also serves to vaporize the gasolene, due to its heat.

Having described my invention, what I claim and desire to secure by Letters Patent is:

1. In a carbureter for hydrocarbon engines, the combination with a gasolene inlet nozzle of a primary air intake, a secondary air intake, independently operating valves for said intakes and a common means controlling said valves.

2. In a carbureter for hydrocarbon engines, the combination with a gasolene inlet nozzle of a primary air intake having a normally open valve, a secondary air intake having a valve normally closed under tension, and a common means operating to increase the tension on the valve of the secondary air intake and to close the valve of the primary air intake.

3. In a carbureter for hydrocarbon engines, the combination with a gasolene inlet nozzle of two independent air intakes for supplying air to mix with the gasolene from said nozzle, independently operating valves in said intakes, and means for closing said valves to increase the richness of the mixture supplied to the engine, for the purpose set forth.

4. In a carbureter for hydrocarbon engines, the combination with a gasolene inlet nozzle arranged to discharge into a mixing chamber, of a primary air intake leading to said chamber, a secondary air intake therefor, a valve for closing said latter intake, a spring normally holding said valve closed, a second spring normally relaxed and serving as a cushion or yielding stop for the opening movements of said valve and means for placing the valve under tension of both said springs, for the purpose set forth.

5. In a carbureter for hydrocarbon engines, the combination with a gasolene inlet nozzle arranged to discharge into a mixing chamber, of a primary air intake leading to said chamber, a secondary air intake therefor, a valve for closing said latter intake, a spring normally holding said valve closed, a second spring normally relaxed and serving as a cushion or yielding stop for the opening movements of said valve, and a manually operated cam for placing the valve under tension of both said springs, for the purpose set forth.

6. In a carbureter for hydrocarbon engines, the combination with a gasolene inlet nozzle arranged to discharge into a mixing chamber, of a primary air intake leading to said chamber, a secondary air intake therefor, a valve for closing said latter intake, a spring normally holding said valve closed, a second spring normally relaxed and serving as a cushion or yielding stop for the opening movements of said valve, and a cam for placing the valve under tension of both said springs, for the purpose set forth.

7. In a carbureter for hydrocarbon engines, the combination with a gasolene inlet nozzle arranged to discharge into a mixing chamber, of a primary air intake leading to said chamber, a secondary air intake therefor, a valve for closing said latter intake, a spring normally holding said valve closed, a second spring normally relaxed and serving as a cushion or yielding stop for the opening movements of said valve, a sliding abutment for said springs, and a cam operating on said abutment to place the valve under tension of both said springs, for the purpose set forth.

8. In a carbureter for hydrocarbon engines, the combination with a mixing chamber, a gasolene nozzle therein, and a primary air intake provided with a valve and a rock shaft for operating said valve, of a secondary air intake provided with a valve, a spring for normally closing said valve, and means for simultaneously increasing the tension of said spring and rocking said shaft to close the valve of the primary air intake.

9. In a carbureter for hydrocarbon engines, the combination with a mixing chamber, of a primary air intake leading to said chamber, a secondary air intake communicating with said chamber, a valve for closing the latter intake, a spring normally holding said valve closed, and a wedge shaped cam movable relatively to the valve to increase the tension of the spring.

10. In a carbureter for hydrocarbon engines, the combination with a mixing chamber, of a primary air intake leading to said chamber, a secondary air intake communicating with said chamber, a valve for closing the latter intake, a spring normally holding said valve closed, and a straight wedge shaped cam movable relatively to the valve to increase the tension of the spring.

11. In a carbureter for hydrocarbon engines, the combination with a mixing chamber, of a primary air intake leading to said chamber, a secondary air intake communicating with said chamber, a valve for closing the latter intake, a spring normally holding said valve closed, a second spring normally inoperative on the valve, and a wedge shaped cam movable relatively to the valve and adapted to place the valve under tension of said second spring.

12. In a carbureter for hydrocarbon engines, the combination with a mixing chamber, of a primary air intake leading to said chamber, a secondary air intake communicating with said chamber, a valve for closing the latter intake, a spring normally holding said valve closed, a second spring normally inoperative on the valve, and a wedge shaped cam movable relatively to the valve and adapted to increase the pressure of both of said springs upon the valve to close the latter.

13. In a carbureter for hydrocarbon engines, the combination with the mixing chamber, of an air intake, a valve therefor, a casing or support in which the stem of the valve is mounted, a spring surrounding the stem of the valve and bearing at one end upon a movable block and at the other end upon a head fixed to said stem, and a wedge shaped cam arranged to shift the movable block on the stem to increase the tension of said spring.

14. In a carbureter, the combination of a frame forming a mixing chamber adapted for connection with an engine to be supplied, means for supplying fuel into said chamber, primary and secondary air inlets to said mixing chamber, a valve for said secondary inlet controlled by suction within the mixing chamber to admit air through said inlet to the mixing chamber, a spring for primarily resisting the opening of said valve and for controlling the operation of said valve during a certain range of suction within the mixing chamber, and a second spring adapted to be automatically brought into service when the suction exceeds a certain value to assist the first spring in controlling the opening and operation of said valve during said increased suction.

15. In a carbureter, the combination of a frame forming a mixing chamber adapted for connection with an engine to be supplied, means for supplying fuel into the mixing chamber, primary and secondary air inlets for said mixing chamber, a valve for said secondary inlet adapted to be opened by the suction within said chamber, a comparatively weak spring tending to prevent opening of said valve during a certain range of suction within the chamber, and a comparatively heavy spring primarily inactive and adapted to be automatically brought into service by increased suction within the chamber to assist the weak spring in controlling the opening and operation of said valve during such increased suction.

16. In a carbureter, the combination of a frame forming a mixing chamber adapted to be connected with an engine to be supplied, means for supplying fuel into the mixing chamber, primary and secondary air inlets for said chamber, a valve for said secondary inlet adapted to be opened by suction within the chamber, a comparatively light spring always engaging the valve and tending to resist opening thereof, and a comparatively heavy spring normally disconnected from said valve and adapted to be automatically brought into operative association with said valve, after a predetermined degree of opening of said valve, whereupon both springs will coöperate to control the opening and operation of the valve to regulate the air flow through said inlet.

17. In a carbureter, the combination of a frame forming a mixing chamber adapted to be connected with an engine to be supplied, means for supplying fuel into the mixing chamber, primary and secondary air inlets for said chamber, a valve for said secondary inlet adapted to be opened by suction within the chamber, a comparatively light spring always engaging the valve and tending to resist opening thereof, a comparatively heavy spring normally disconnected from said valve and adapted to be automatically brought into operative association with said valve after a predetermined degree of opening of said valve, whereupon both springs will coöperate to control the opening and operation of the valve to regulate the air flow through said inlet, and adjusting means for determining the degree of opening of said valve which will cause said second spring to become operatively active.

18. In a carbureter, the combination of a frame forming a mixing chamber adapted for connection with an engine to be supplied, means arranged below said chamber and in alinement therewith for supplying fuel into the chamber, a primary air inlet below said means, a secondary air inlet arranged laterally of said chamber and in communication therewith, a valve for said secondary inlet adapted to be opened by suction within the mixing chamber to admit air through said inlet to the mixing chamber, a spring for independently resisting the opening of said valve for the lower range of suction in said chamber, and a second spring adapted to coöperate with the first-mentioned spring to resist the opening of said valve for the higher range of suction in said chamber.

19. In a carbureter, the combination of a frame forming a mixing chamber adapted for connection with an engine to be supplied, a throttle valve in said chamber, means arranged below said chamber and in alinement therewith for supplying fuel into the chamber, a primary air inlet below said means, a secondary air inlet arranged laterally of said chamber and in communication therewith, a valve for said secondary inlet adapted to be opened by suction within the mixing chamber to admit air through said inlet to the chamber, a spring for independently resisting the opening of said valve for the lower range of suction in said chamber, a second spring arranged to be primarily inactive and also coöperate with the first-mentioned spring to resist the opening of said valve for the higher range of suction in said chamber, and means for adjusting the tension of both of said springs.

20. In a hydrocarbon motor, the combination with the carbureter having main and auxiliary air intakes, of a shut-off valve in the main air intake, a spring closed valve in the auxiliary air intake, means for closing said shut-off valve, means for regulating the tension on said spring closed valve, and means adapted to automatically open said shut-off valve when said regulating means is actuated to decrease the tension on said spring closed valve.

21. In a hydrocarbon motor, the combination with a carbureter having main and auxiliary air intakes, of means for closing said main intake, a spring closed valve for the auxiliary air intake, means for regulating the tension on said spring closed valve, and for automatically opening said main intake closing means when the tension on said spring closed valve is decreased.

22. In a carbureter for hydrocarbon engines, the combination with the gasolene inlet nozzle of a plurality of air intakes, independently operating valves for said intakes, and a common means coöperating with said valves in succession for controlling the passage of air through said intakes.

23. In a carbureter for hydrocarbon engines, the combination with the mixing chamber and the throttle valve thereof, of the gasolene inlet nozzle, a primary air intake supplying air adjacent said nozzle, a secondary air intake having a spring closed valve, and manually controlled means operating independently of said throttle valve for restricting the passage of air through both of said intakes.

24. In a carbureter for hydrocarbon engines, the combination with a gasolene inlet nozzle, of a primary air intake supplying air adjacent said nozzle, a secondary air intake having a spring closed valve, and manually controlled means for successively restricting the passage of air through both of said intakes.

25. In a carbureter for hydrocarbon engines, the combination with a gasolene inlet nozzle, of a primary air intake supplying air adjacent said nozzle, a secondary air intake having a spring closed valve, and manually controlled means for simultaneously restricting the passage of air passing through both of said intakes said means operating to vary the opening resistance of said spring closed valve.

26. In a carbureter for hydrocarbon engines, the combination with a fuel inlet nozzle, of a primary air intake, a secondary air intake having an automatically operating valve for controlling the same, a plurality of concentrically arranged springs adapted to resist opening movements of said valve, and means comprising a member having an inclined surface for varying the tension of the outer of said springs.

27. In a carbureter for hydrocarbon engines, the combination with a fuel inlet nozzle, of a primary air intake, a secondary air intake, a valve for the latter intake having a stem, an abutment on said stem, a plurality of concentrically arranged compression springs surrounding said stem and having their outer ends adapted to be engaged by said abutment, and means engaging the opposite ends of said springs and including a member having an inclined surface whereby the tension of the outer of said springs is varied.

In testimony whereof I affix my signature in presence of two witnesses.

RUSSELL HUFF.

Witnesses:
  M. TIBBETTS.
  C. L. DALE.